United States Patent Office 3,793,308
Patented Feb. 19, 1974

3,793,308
4-SPIRO[CYCLOPROPYL]ANDROSTENES AND PROCESS FOR THEIR PRODUCTION
Gilbert A. Youngdale, Portage, Mich., assignor to The Upjohn Company, Kalamazoo, Mich.
No Drawing. Filed Nov. 8, 1972, Ser. No. 304,849
Int. Cl. C07c 173/10
U.S. Cl. 260—239.55 R     12 Claims

ABSTRACT OF THE DISCLOSURE

Novel 4-spiro[cyclopropyl]androstenes embraced by the formulae:

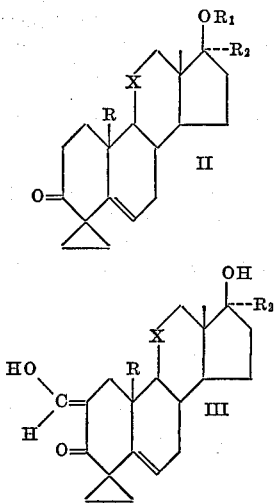

and

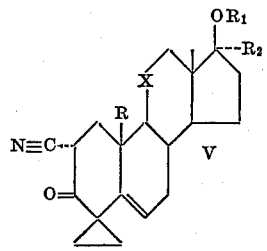

wherein R is selected from the group consisting of hydrogen and methyl; $R_1$ is selected from the group consisting of hydrogen and acyl; $R_2$ is selected from the group consisting of hydrogen, lower-alkyl, lower-alkenyl and lower-alkynyl; and X is selected from the group consisting of methylene

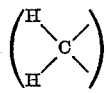

β-hydroxymethylene

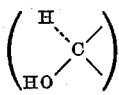

and carbonyl (O=C<). The compounds of Formulae II, III and V inhibit the enzyme 3β-hydroxy steroid dehydrogenase and are thus useful in regulating the production of gonadal hormones. The aforesaid compounds of Formulae II, III, and V are consequently useful in treating mammals, including birds in those conditions where the foregoing properties make the novel compounds valuable in medical and veterinary practice.

BRIEF SUMMARY OF THE INVENTION

This invention relates to novel 4-spiro[cyclopropyl]androstenes, intermediates and processes for their production.

DETAILED DESCRIPTION OF THE INVENTION

The novel compounds of this invention, intermediates therefor, and processes for their production are illustratively represented by the following sequence of formulae:

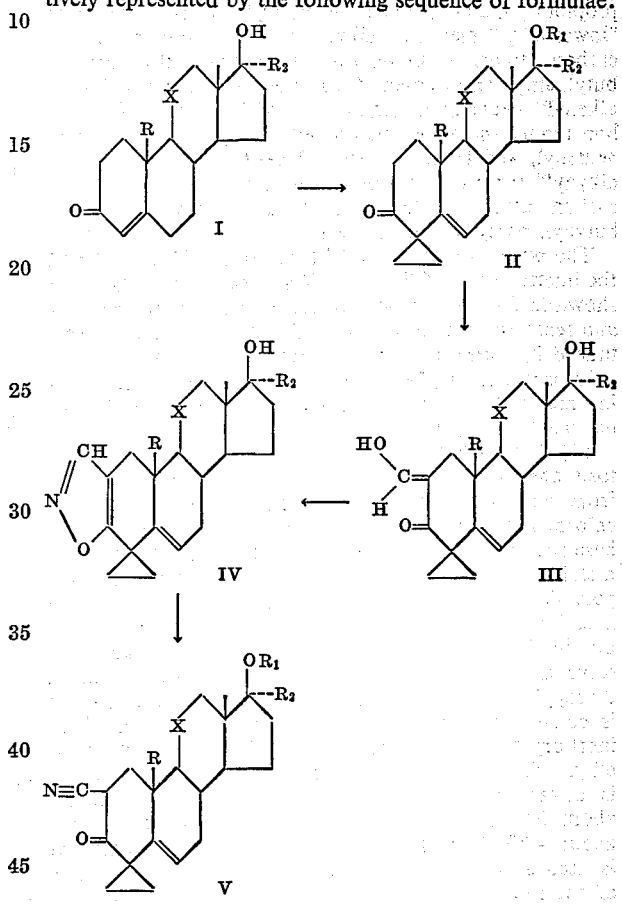

wherein R, $R_1$, $R_2$ and X have the meanings given above.

The compounds of Formulae II, III and V of this invention inhibit the production and secretion of ovarian and testicular steroid hormones including testosterone, estradiol, and progesterone. They are thus useful both in treating animals, including human beings, with pathological production of said hormones (in order to decrease gonadal steroid production) as well as those with essentially normal production (in order to interrupt gonadal steroid production). Accordingly, compounds of Formula I are useful in the treatment of prostatic hypertrophy, hirsutism, acne, virilization, hyperestrogenism, and in regulation of fertility. The compounds of Formula I also have anti-inflammatory activity.

The compounds of Formulae II, III and V of this invention, can be prepared and administered to mammals, birds and animals, in a wide variety of oral or parenteral dosage forms, singly or in admixture with other coacting compounds, in doses of about 1 to 1,000 mg. one to three times a day, depending on the severity of the condition being treated and the recipient's response to the medication. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

In this application the term "acyl" means the acyl radical of an organic carboxylic acid, preferably a hydrocarbon carboxylic acid of from one to twelve carbon atoms inclusive, for example, saturated and unsaturated aliphatic acids and aromatic acids, such as acetic, propionic, butyric, valeric, caproic, caprylic, octanoic, decanoic, dodecanoic, tripropylacetic, crotonic, cycyopentylacetic, cyclopentylpropionic, cyclohexylacetic, benzoic, toluic, ethylbenzoic, phenylbutyric, phenylvaleric, cinnamic, naphthaleneacetic, p-butoxyphenylpropionic, phenylpropionic, glutaric, maleic acids, and the like. The term "lower-alkyl" means an alkyl radical, of from one to five carbon atoms, inclusive, such as methyl, ethyl, propyl, butyl, amyl, and isomeric forms thereof. The term "loweralkenyl" means an alkenyl radical of from two to five carbon atoms, inclusive, such as ethenyl, propenyl, butenyl, pentenyl, and isomeric forms thereof. The term "loweralkynyl" means an alkynyl radical of from two to five carbon atoms, inclusive, such as ethynyl, propynyl, butynyl, pentynyl and isomeric forms thereof.

The novel compounds of Formulae II, III, and V and the intermediates of Formula IV are prepared by the route shown in the above flow diagram, employing the methods and reactions described below. The starting materials embraced by Formula I are all known in the art.

In carrying out the process of this invention the starting materials of Formula I are subjected to the following reaction steps:

(1) The selected 17β-hydroxyandrost-4-en-3-one(testosterone) (I) is reacted with a 1,2-dihaloethane selected from the group consisting of 1,2-dibromoethane, 1,2-dichloroethane and 1,2-diiodoethane in the presence of a base such as sodium amide, potassium amide, or an alkali metal tertiary alkoxide, such as sodium tert. amylate, potassium tert. butoxide and the like, when the base is a sodium or potassium amide the reaction is carried out in the presence of liquid ammonia, although other solvents such as pyridine, dimethylamine, diethylamine, dipropylamine, and the like, can be used. The steroid is conveniently kept in solution by the addition of an inert organic solvent such as tetrahydrofuran, dioxane, diethyl ether, dimethylether and the like. The reaction is advantageously conducted at a temperature below about 0° C. and preferably within the range of from about −30° C. to about −50° C. when liquid ammonia is used as a solvent. The time required for completion of the reaction ranges from about 1 to about 24 hours depending in part on the selected reactants and the temperature employed for carrying out the reaction. The corresponding 17β-hydroxyspiro[androst-5 - ene-4,1'-cyclopropan]-3-one (II), thus obtained is recovered from the reaction mixture by conventional methods.

(2) The compounds of Formula II in which $R_1$ is hydrogen are reacted with ethyl formate in accordance with the procedure disclosed in U.S. Pat. 2,927,933 to obtain the compounds of Formula III. For example, the selected 17β-hydroxyspiro[androst-5 - ene-4,1'-cyclopropan]-3-one (II) is treated with ethyl formate in the presence of an inert organic solvent, preferably a nonpolar, nonprototropic solvent, e.g. benzene, toluene, dioxane, pyridine and the like, and a base, such as an alkali metal alkoxide, e.g. sodium methoxide, sodium tertiary butoxide and the like, or an alkali metal hydride, e.g. sodium hydride and the like to give the corresponding 17β-hydroxy-2 - (hydroxymethylene)spiro[androst-5-ene-4,1'-cyclopropan]-3-one (III).

(3) The compounds of Formula III are reacted with hydroxylamine hydrochloride in accordance with the procedure disclosed in U.S. Pat. 3,144,449 to obtain the compounds of Formula IV in which $R_1$ is hydrogen. For example, the selected 17β-hydroxy-2-(hydroxymethylene)spiro[androst-5-ene-4,1'-cyclopropan]-3-one (III) is treated with a solution of an alkali metal acetate, e.g. sodium acetate, in a suitable solvent such as methanol, ethanol, acetic acid, pyridine, tetrahydrofuran, dioxane, dimethylsulfoxide, dimethylformamide, and the like, to obtain the corresponding spiro[androsta-2,5-dieno[2,3-d] isoxazole-4,1'-cyclopropan]-17β-ol (IV). The reaction can be carried out under reflux conditions until the reaction is complete: a period from about 15 minutes to about 5 hours is generally sufficient for completion of the reaction, or alternatively, the reaction mixture can be allowed to react at ambient temperature (e.g. room temperature) for a period of from about 8 to about 24 hours to complete the reaction. The reaction can be carried out under either an anhydrous or aqueous condition.

(4) The compounds of Formula IV are converted to the compounds of Formula V in which $R_1$ is hydrogen, in accordance with the procedure disclosed in U.S. Pat. 3,296,255, by cleaving the selected isoxazole (IV) with a strong base, alkali metal alkoxides are preferred and the reaction is best carried out under anhydrous conditions.

The 2α-carbonitriles of Formula V are acidic in nature, having an active hydrogen atom in the 2-position and therefore form salts with strong bases such as alkali metal hydroxides or alkoxides. Thus, in the cleavage of the isoxazole a salt of the 2α-carbonitriles (V) is initially produced, and said salt is converted to the free 2α-carbonitrile by acidification. For the purposes of the present invention the salts are the full equivalents of the free 2α-carbonitriles (V).

(5) Acyl derivatives of the compounds of Formulae II and V of this invention in which $R_1$ is hydrogen, are prepared in accordance with methods commonly used for preparing steroid acylates to obtain the corresponding compounds of Formulae II and V of this invention wherein $R_1$ is acyl. For example, they are prepared by treating the compound in pyridine with excess acid anhydride or acid chloride at about room temperature for 1–24 hours, or by heating the selected compound with an acid anhydride in the presence of pyridine or an alkali earth carbonate such as calcium carbonate. Acylating agents which can be employed are, for example, the anhydrides and chlorides of those acids hereinbefore listed. The excess acylating agent is destroyed by cautious addition of water to the reaction mixture at 0–10° C. and the product is then isolated by conventional methods.

All of the compounds included within Formulae II through V of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate, ether, methylene chloride, Skellysolve B hexanes, and mixtures and combinations of these solvents; also by gradient elution chromatography from an adsorbent column with a suitable mixture of solvents, such as, methylene chloride-Skellysolve B, acetone-Skellysolve B, and the like, and/or by crystallization from a suitable organic solvent or solvents such as those named hereinabove.

The following examples are illustrative of the products and processes of the present invention but are not intended to limit the scope thereof.

Example 1.—17β-hydroxy-17α-methylspiro[androst-5-ene-4,1'-cyclopropan]-3-one (II)

To a stirred mixture of sodium amide (prepared from 9.12 g., 0.395 mole of sodium) in 500 ml. of liquid ammonia is added 40 g. (0.132 mole) of 17α-methyltestosterone (I) in 300 ml. of dry tetrahydrofuran during a period of about 45 minutes. The reaction mixture is stirred an additional 15 minutes and then 74.4 g. (0.395 mole) of 1,2-dibromoethane is added during a period of about 35 minutes, followed by 200 ml. of tetrahydrofuran. The mixture is refluxed (Dry Ice condenser) for about 3 hours and then the ammonia is allowed to evaporate overnight. Water (200 ml.) is added cautiously; the tetrahydrofuran is evaporated and then an additional 200 ml. of water is added. The mixture is extracted with methylene chloride. The extract is dried over anhydrous magnesium sulfate and then the methylene chloride is removed by evaporation. The residue thus obtained is dissolved in 10% acetone-methylene chloride and adsorbed on a 2 kg. column of silica gel (packed in 10% acetone-methylene chloride). The column is eluted with 10% acetone-methylene chloride and 200 ml. fractions are collected. Fractions 29–34 are combined and crystallized from acetone-Skellysolve B hexanes to give 3.9 g. of 17β-hydroxy-17α-methylspiro[androst-5-ene-4,1'-cyclopropan]-3-one (II), M.P. 165–173° C. Fractions 35–47, which are mixtures of product and starting material, are combined with the residue from the evaporation of the solvent from the crystallization filtrate. The material thus obtained is chromatographed as above and the product is crystallized from acetone-Skellysolve B hexanes to give 4.3 g. of 17β-hydroxy-17α-methylspiro[androst-5-ene-4,1'-cyclopropan]-3-one (II), M.P. 177–179° C. The combined total yield is 8.2 g. (19%) of 17β-hydroxy-17α-methylspiro[androst-5-ene-4,4'-cyclopropan]-3-one (II); an analytical sample of which recrystallized from ether-Skellysolve B hexanes melts at 175–178° C; $[\alpha]_D CHCl_3 -80°$; IR (infrared) and NMR (nuclear magnetic responance) spectra support the assigned structure.

Analysis.—Calcd. for $C_{22}H_{32}O_2$ (percent): C, 80.44; H, 9.98. Found (percent): C, 80.29; H, 9.82.

Example 2.—17β-hydroxyspiro[androst-5-ene-4,1'-cyclopropan]-3-one (II)

Following the procedure and conditions of Example 1, above, 0.132 mole of testosterone is reacted with 1,2-dibromoethane and the product thus obtained is chromatographed on silica gel to give 17β-hydroxyspiro[androst-5-ene-4,1'-cyclopropan]-3-one (II).

In the same manner following the procedure of Example 1, above, other testosterones and 19-nortestosterones of Formula I are likewise converted to the corresponding 17β - hydroxyspiro[androst - 5 - ene - 4,1' - cyclopropan]-3-ones and 17β-hydroxyspiro[estra-5-ene-4,1'-cyclopropan]-3-ones of Formula II, the following are representative, 17α-ethyltestosterone to obtain 17α-ethyl-17β-hydroxyspiro[androst-5-ene-4,1'-cyclopropan]-3-one;

17α-propyltestosterone to obtain 17α-propyl-17β-hydroxyspiro[androst-5-ene-4,1'-cyclopropan]-3-one;

17α-ethenyltestosterone to obtain 17α-ethenyl-17β-hydroxyspiro[androst-5-ene-4,1'-cyclopropan]-3-one;

17α-allyltestosterone to obtain 17α-allyl-17β-hydroxyspiro[androst-5-ene-4,1'-cyclopropan]-3-one;

17α-ethynyltestosterone to obtain 17α-ethynyl-17β-hydroxyspiro[androst-5-ene-4,1'-cyclopropan]-3-one;

17α-propynyltestosterone to obtain 17α-propynyl-17β-hydroxyspiro[androst-5-ene-4,1'-cyclopropan]-3-one;

11β-hydroxytestosterone to obtain 11β,17β-dihydroxyspiro[androst-5-ene-4,1'-cyclopropan]-3-one;

11β-hydroxy-17α-methyltestosterone to obtain 11β,17β-dihydroxy-17α-methylspiro[androst-5-ene-4,1' - cyclopropan]-3-one;

17α-ethyl-11β-hydroxytestosterone to obtain 17α-ethyl-11β,17β - dihydroxyspiro[androst - 5 - ene - 4,1' - cyclopan]-3-one;

11β-hydroxy-17α-propyltestosterone to obtain 11β,17β-dihydroxy - 17α - propylspiro[androst- - 5 - ene - 4,1'-cyclopropan]-3-one;

17α-ethenyl-11β-hydroxytestosterone to obtain 17α-ethenyl - 11β,17β - dihydroxyspiro[androst-5 - ene - 4,1'-cyclopropan]-3-one;

17α-allyl-11β-hydroxytestosterone to obtain 17α-allyl-11β,17β - dihydroxyspiro[androst - 5 - ene - 4,1' - cyclopropan]-3-one;

17α-ethynyl-11β-hydroxytestosterone to obtain 17α-ethynyl - 11β,17β - dihydroxyspiro[androst - 5 - ene - 4,1'-cyclopropan]-3-one;

11β-hydroxy-17α-propynyltestosterone to obtain 11β,17β - dihydroxy - 17α - propynylspiro[androst - 5 - ene-4,1'-cyclopropan]-3-one;

11-ketotestosterone to obtain 17β-hydroxyspiro[androst-5-ene-4,1'-cyclopropane]-3,11-dione;

11-ketone-17α-methyltestosterone to obtain 17β-hydroxy - 17α - methylspiro[androst - 5 - ene - 4,1' - cyclopropane]-3-,11-dione;

17α-ethyl-11-ketotestosterone to obtain 17α-ethyl-17β-hydroxyspiro[androst - 5 - ene - 4,1' - cyclopropane]-3,11-dione;

11-keto-17α-propyltestosterone to obtain 17β-hydroxy-17α - propylspiro[androst - 5 - ene - 4,1' - cyclopropane]-3,11-dione;

17α-ethenyl-11-ketotestosterone to obtain 17α-ethenyl-17β - hydroxyspiro[androst - 5 - ene - 4,1' - cyclopropane-3,11-dione;

17α-allyl-11-ketotestosterone to obtain 17α-allyl-17β-hydroxyspiro[androst - 5 - ene - 4,1' - cyclopropane]-3,11-dione;

17α-ethynyl-11-ketotestosterone to obtain 17α-ethynyl-17β - hydroxyspiro[androst - 5 - ene - 4,1' - cyclopropane]-3,11-dione;

11-keto-17α-propynyltestosterone to obtain 17β-hydroxy - 17α - propynylspiro[androst - 5 - ene - 4,1' - cyclopane]-3,11-dione;

19-nortestosterone to obtain 17β-hydroxyspiro[estra-5-ene-4,1'-cyclopropan]-3-one;

17α-methyl-19-nortestosterone to obtain 17β-hydroxy-17α-methylspiro[estra-5-ene-4,1'-cyclopropan]-3-one;

17α-ethyl-19-nortestosterone to obtain 17α-ethyl-17β-hydroxyspiro[estra-5-ene-4,1'-cyclopropan]-3-one;

17α-propyl-19-nortestosterone to obtain 17α-propyl-17β-hydroxyspiro[estra-5-ene-4,1'-cyclopropan]-3-one;

17α-ethenyl-19-nortestosterone to obtain 17α-ethenyl-17β-hydroxyspiro[estra-5-ene-4,1'-cyclopropan]-3-one;

17α-allyl-19-nortestosterone to obtain 17α-allyl-17β-hydroxyspiro[estra-5-ene-4,1'-cyclopropan]-3-one;

17α-ethynyl-19-nortestosterone to obtain 17α-ethynyl-17β-hydroxyspiro[estra-5-ene-4,1'-cyclopropan]-3-one;

17α-propynyl-19-nortestosterone to obtain 17α-propynyl - 17β - hydroxyspiro[estra - 5 - ene - 4,1' - cyclopropan]-3-one;

11β-hydroxy-19-nortestosterone to obtain 11β-,17β-dihydroxyspiro[estra-5-ene-4,1'-cyclopropan]-3-one;

11β-hydroxy-17α-methyl-19-nortestosterone to obtain 11β-,17β - dihydroxy - 17α - methylspiro[estra - 5 - ene-4,1'-cyclopropan]-3-one;

17α-ethyl - 11β - hydroxy-19-nortestosterone to obtain 17α-ethyl - 11β,17β - dihydroxyspiro[estra - 5 - ene-4,1'-cyclopropan]-3-one;

11β-hydroxy - 17α - propyl-19-nortestosterone to obtain 11β,17β-dihydroxy - 17α - propylspiro[estra - 5 - ene-4,1'-cyclopropan]-3-one;

17α - ethenyl-11β-hydroxy-19-nortestosterone to obtain 17α-ethenyl - 11β,17β - dihydroxyspiro[estra-5-ene-4,1'-cyclopropan]-3-one;

17α-allyl - 11β - hydroxy-19-nortestosterone to obtain 17α-allyl - 11β,17β - dihydroxyspiro[estra - 5 - ene-4,1'-cyclopropan]-3-one;

17α-ethynyl-11β-hydroxy-19-nortestosterone to obtain 17α - ethynyl - 11β,17β - dihydroxyspiro[estra-5-ene-4,1'-cyclopropan]-3-one;

11β-hydroxy-17α-propynyl-19-nortestosterone to obtain 11β,17β - dihydroxy - 17α - propynylspiro[estra - 5 - ene-4,1'cyclopropan]-3-one;

11-keto-19-nortestosterone to obtain 17β-hydroxyspiro[estra-5-ene-4,1'-cyclopropane]-3,11-dione;

11-keto-17α-methyl-19-nortestosterone to obtain 17β-hydroxy-17α-methylspiro[estra-5-en-4,1'-cyclopropane]-3,11-dione;

17α-ethyl-11-keto-19-nortestosterone to obtain 17α-ethyl-17β-hydroxyspiro[estra-5-ene-4,1'-cyclopropane]-3,11-dione;

11-keto-17α-propyl-19-nortestosterone to obtain 17β-hydroxy-17α-methylspiro[estra-5-ene-4,1'-cyclopropane]-3,11-dione;

17α-ethenyl-11-keto-19-nortestosterone to obtain 17α-ethenyl-17β-hydroxyspiro[estra-5-ene-4,1'-cyclopropane]-3,11-dione;

17α-allyl-11-keto-19-nortestosterone to obtain 17α-allyl-17β-hydroxyspiro[estra-5-ene-4,1'-cyclopropane]-3,11-dione;

17α-ethynyl-11-keto-19-nortestosterone to obtain 17α-ethynyl-17β-hydroxyspiro[estra-5-ene-4,1'-cyclopropane]-3,11-dione;

11-keto-17α-propynyl-19-nortestosterone to obtain 17β-hydroxy 17α-propynylspiro[estra-5-ene-4,1'-cyclopropane]-3,11-dione; and the like.

Example 3.—17β-hydroxy-2-(hydroxymethylene-17α-methylspiro[androst-5-ene-4,1'-cycloprpan]-3-one (III)

To a stirred solution of 7 g. (0.0213 mole) of 17β-hydroxy-17α-methylspiro[androst-5-ene-4,1'-cyclopropan]-3-one (II) in 80 ml. of pyridine under nitrogen is added 16 ml. (0.2 mole) of ethyl formate followed by a solution of sodium methoxide (prepared from 1.38 g. (0.058 mole) of sodium) in 20 ml. of methanol. The reaction mixture is stirred for about 21 hours. The reaction mixture is then poured into a cold solution of 80 ml. of acetic acid and 600 ml. of water. The material which separates is collected by filtration and dissolved in ether. The ether solution is washed with water and dried over anhydrous magnesium sulfate. Evaporation of the ether gives 6.8 g. of residue which is dissolved in 10% acetone-methylene chloride and adsorbed on a 500 g. column of silica gel (packed in 10% acetone-methylene chloride). The column is eluted with 10% acetone-methylene chloride and 200 ml. fractions are collected. The fractions containing the desired product are combined and crystallized from acetone-Skellysolve B hexanes giving 5.67 g. of 17β-hydroxy-2-(hydroxymethylene)-17α-methylspiro[androst-5-ene-4,1'-cyclopropan]-3-one (III), M.P. 173–175° C., a sample recrystallized from the same solvent mixture melts at 172–174° C.; [α]$_D$ CHCl$_3$ —136°; IR and NMR data support the assigned structure.

Analysis.—Calcd. for $C_{23}H_{32}O_3$ (percent): C, 77.49; H, 9.05. Found (percent): C, 77.46; H, 9.14.

Example 4.—17β-hydroxy-2-(hydroxymethylene)spiro[androst-5-ene-4,1'-cyclopropan]-3-one (III)

Following the procedure and conditions of Example 3, above, 0.0213 mole of 17β-hydroxyspiro[androst-5-ene-4,1'-cyclopropan]-3-one (II) is reacted with ethyl formate to give 17β-hydroxy-2-(hydroxymethylene)spiro[androst-5-ene-4,1'-cyclopropan]-3-one (III).

In the same manner following the procedure of Example 3, above, other 17β-hydroxyspiro[androst-5-ene-4,1'-cyclopropan]-3-ones and 17β-hydroxyspiro[estra-5-ene-4,1'-cyclopropan]-3-ones of Formula II are likewise converted to the corresponding 2-hydroxymethylene compounds of Formula III, for example the compounds prepared and listed in Example 2, above, give:

17α-ethyl-17β-hydroxy-2-(hydroxymethylene)spiro-[androst-5-ene-4,1'-cyclopropan]-3-one;

17α-propyl-17β-hydroxy-2-(hydroxymethylene)spiro-[androst-5-ene-4,1'-cyclopropan]-3-one;

17α-ethenyl-17β-hydroxy-2-(hydroxymethylene)spiro-[androst-5-ene-4,1'-cyclopropan]-3-one;

17α-allyl-17β-hydroxy-2-(hydroxymethylene)spiro-[androst-5-ene-4,1'-cyclopropan]-3-one;

17α-ethynyl-17β-hydroxy-2-(hydroxymethylene)spiro-[androst-5-ene-4,1'-cyclopropan]-3-one;

17α-propyl-17β-hydroxy-2-(hydroxymethylene)spiro-[androst-5-ene-4,1'-cyclopropan]-3-one;

11β,17β-dihydroxy-2-(hydroxymethylene)spiro[androst-5-ene-4(1'-cyclopropan]-3-one;

11β,17β-dihydroxy-2-(hydroxymethylene)-17α-methylspiro[androst-5-ene-4,1'-cyclopropan]-3-one;

17α-ethyl-11β,17β-dihydroxy-2-(hydroxymethylene)spiro-[androst-5-ene-4,1'-cyclopropan]-3-one;

11β,17β-dihydroxy-2-(hydroxymethylene)-17α-propyl-spiro[androst-5-ene-4,1'-cyclopropan]-3-one;

17α-ethenyl-11β,17β-dihydroxy-2-(hydroxymethylene)spiro[androst-5-ene-4,1'-cyclopropan]-3-one;

17α-allyl-11β,17β-dihydroxy-2-(hydroxymethylene)spiro-[androst-5-ene-4,1'-cyclopropan]-3-one;

17α-ethynyl-11β,17β-dihydroxy-2-(hydroxymethylene)spiro[androst-5-ene-4,1'-cyclopropan]-3-one;

11β,17β-dihydroxy-2-(hydroxymethylene)-17α-propynyl-spiro[androst-5-ene-4,1'-cyclopropan]-3-one;

17β-hydroxy-2-(hydroxymethylene)spiro[androst-5-ene-4,1'-cyclopropane]-3,11-dione;

17β-hydroxy-2-(hydroxymethylene)-17α-methylspiro-[androst-5-ene-4,1'-cyclopropane]-3,11-dione;

17α-ethyl-17β-hydroxy-2-(hydroxymethylene)spiro-[androst-5-ene-4,1'-cyclopropane]-3,11-dione;

17β-hydroxy-2-(hydroxymethylene)-17α-propylspiro-[androst-5-ene-4,1'-cyclopropane]-3,11-dione;

17α-ethenyl-17β-hydroxy-2-(hydroxymethylene)spiro-[androst-5-ene-4,1'-cyclopropane]-3,11-dione;

17α-allyl-17β-hydroxy-2-(hydroxymethylene)spiro-[androst-5-ene-4,1'-cyclopropane]-3,11-dione;

17α-ethynyl-17β-hydroxy-2-(hydroxymethylene)spiro-[androst-5-ene-4,1'-cyclopropane]-3,11-dione;

17β-hydroxy-2-(hydroxymethylene)-17α-propynylspiro-[androst-5-ene-4,1'-cyclopropane]-3,11-dione;

17β-hydroxy-2-(hydroxymethylene)spiro[estra-5-ene-4,1'-cyclopropan]-3-one;

17β-hydroxy-2-(hydroxymethylene)-17α-methylspiro-[estra-5-ene-4,1'-cyclopropan]-3-one;

17α-ethyl-17β-hydroxy-2-(hydroxymethylene)spiro-[estra-5-ene-4,1'-cyclopropan]-3-one;

17α-propyl-17β-hydroxy-2-(hydroxymethylene)spiro-[estra-5-ene-4,1'-cyclopropan]-3-one;

17α-ethenyl-17β-hydroxy-2-(hydroxymethylene)spiro-[estra-5-ene-4,1'-cyclopropan]-3-one;

17α-allyl-17β-hydroxy-2-(hydroxymethylene)spiro-[estra-5-ene-4,1'-cyclopropan]-3-one;

17α-ethynyl-17β-hydroxy-2-(hydroxymethylene)spiro-[estra-5-ene-4,1'-cyclopropan]-3-one;

17α-propynyl-17β-hydroxy-2-(hydroxymethylene)spiro-[estra-5-ene-4,1'-cyclopropan]-3-one;

11β,17β-dihydroxy-2-(hydroxymethylene)spiro[estra-5-ene-4,1'-cyclopropan]-3-one;

11β,17β-dihydroxy-2-(hydroxymethylene)-17α-methyl-spiro[estra-5-ene-4,1'-cyclopropan]-3-one;

17α-ethyl-11β,17β-dihydroxy-2-(hydroxymethylene)spiro[estra-5-ene-4,1'-cyclopropan]-3-one;

11β,17β-dihydroxy-2-(hydroxymethylene)-17α-propyl-spiro[estra-5-ene-4,1'-cyclopropan]-3-one;

17α-ethenyl-11β,17β-dihydroxy-2-(hydroxymethylene)spiro[estra-5-ene-4,1'-cyclopropan]-3-one;

17α-allyl-11β,17β-dihydroxy-2-(hydroxymethyl)spiro[estra-5-ene-4,1'-cyclopropan]-3-one;

17α-ethynyl-11β,17β-dihydroxy-2-(hydroxymethylene)spiro[estra-5-ene-4,1'-cyclopropan]-3-one;

11β,17β-dihydroxy-2-(hydroxymethylene)-17α-propynyl-spiro[estra-5-ene-4,1'-cyclopropan]-3-one;

17β-hydroxy-2-(hydroxymethylene)spiro[estra-5-ene-4,1'-cyclopropane]-3,11-dione;

17β-hydroxy-2-(hydroxymethylene)-17α-methylspiro[estra-5-ene-4,1'-cyclopropane]-3,11-dione;

17α-ethyl-17β-hydroxy-2-(hydroxymethylene)spiro-[estra-5-ene-4,1'-cyclopropane]-3,11-dione;

17β-hydroxy-2-(hydroxymethyl)-17α-propylspiro-
[estra-5-ene-4,1'-cyclopropane]-3,11-dione;
17α-ethenyl-17β-hydroxy-2-(hydroxymethylene)spiro-
[estra-5-ene-4,1'-cyclopropane]-3,11-dione;
17α-allyl-17β-hydroxy-2-(hydroxymethylene)spiro-
[estra-5-ene-4,1'-cyclopropane]-3,11-dione;
17α-ethynyl-17β-hydroxy-2-(hydroxymethylene)spiro-
[estra-5-ene-4,1-cyclopropane]-3,11-dione; and
17β-hydroxy-2-(hydroxymethylene)-17α-propynylspiro-
[estra-5-ene-4,1'-cyclopropane]-3,11-dione; respectively, and the like.

Example 5.—17α - methylspiro[androsta-2,5-diene[2,3-d]
isoxazole-4,1'-cyclopropan]17β-ol (IV)

A solution of 4.2 g. (0.0118 mole) of 17β-hydroxy-17α-methyl-2-(hydroxymethylene)spiro[androst - 5 - ene-4,1'-cyclopropan]-3-one (III) in 40 ml. of acetic acid is added to a solution of 0.89 g. (0.0128 mole) of hydroxylamine hydrochloride and 1.18 g. (0.0144 mole) of sodium acetate in 10 ml. of water. The reaction mixture is refluxed for about 1 hour, poured into water, and cooled in an ice bath. The solid which separates is collected by filtration, washed with water, and dissolved in ether. The ether solution is washed three times with water and dried over anhydrous magnesium sulfate. Evaporation of the ether gives an oil. The oil thus obtained is dissolved in 10% acetone-methylene chloride and adsorbed on a 250 g. column of silica gel (packed in 10% acetone-methylene chloride). The column is eluted with 10% acetone-methylene chloride and 200 ml. fractions are collected. Fractions 2–3 are combined and crystallized from acetone-Skellysolve B hexanes giving 0.4 g. of yellow prisms, M.P. 195–198° C.; recrystallization gives 17,17-dimethylspiro[cyclopropane-1,4'-[18]norandrosta - 2,5,13 - trieno[2,3-d]isoxazole], M.P. 196–199° C.; [α]$_D$ CHCl$_3$ —205°; IR and NMR data support the assigned structure.

Analysis.—Calcd. for $C_{23}H_{29}NO$ (percent): C, 82.34; H, 8.71; N, 4.18. Found (percent): C, 81.61; H, 8.53; N, 3.90.

Fractions 4–7 are combined and crystallized from acetone-Skellysolve B hexanes giving 3.2 g. of 17α-methylspiro[androsta-2,5-diene[2,3-d]isoxazole - 4,1' - cyclopropan]17β-ol (IV), M.P. 144–146° C.; which after recrystallization from the same solvent mixture melted at 143–145° C.; [α]$_D$ CHCl$_3$ —93°; IR and NMR data support the assigned structure.

Analysis.—Calcd. for $C_{23}H_{31}NO_2$ (percent): C, 78.14; H, 8.84; N, 3.96. Found (percent): C, 77.49 H, 8.55; N, 4.04.

Example 6—spiro[androst-2,5-diene[2,3-d]isoxazole-
4,1'-cyclopropan]-17β-ol (IV)

Following the procedure and conditions of Example 5, above, 0.0118 mole of 17β-hydroxy-2-(hydroxymethylene)spiro[androst-5-ene - 4,1' - cyclopropan]-3-one (III) is reacted with hydroxylamine hydrochloride to give spiro-[androst-2,5-diene[2,3-d]isoxazole - 4,1' - cyclopropan] 17β-ol (IV)

In the same manner following the procedure of Example 6, above, the other 2-hydroxymethylene compounds of Formula III are likewise converted to the corresponding [2,3-d]isoxazoles of Formula IV, for example the compounds prepared and listed in Example 4, above, give:

17α-ethylspiro[androsta-2,5-diene[2,3-d]isoxazole-
4,1'-cyclopropane]-17β-ol;
17α-propylspiro[androsta-2,5-diene[2,3-d]isoxazole-
4,1'-cyclopropane]-17β-ol;
17α-ethylenylspiro[androsta-2,5-diene[2,3-d]isoxazole-
4,1'-cyclopropane]-17β-ol;
17α-allylspiro[androsta-2,5-dieno[2,3-d]isoxazole-
4,1'-cyclopropane]-17β-ol;
17α-ethynylspiro[androsta-2,5-dieno[2,3-d]isoxazole-
4,1'-cyclopropane]-17β-ol;
17α-propynylspiro[androsta-2,5-diene[2,3-d]isoxazole-
4,1'-cyclopropane]-17β-ol;
spiro[androsta-2,5-dieno[2,3-d]isoxazole-4,1'-cyclopropane]-11β,17β-diol;
17α-methylspiro[androsta-2,5-dieno[2,3-d]isoxazole-
4,1'-cyclopropane]-11β,17β-diol;
17α-ethylspiro[androsta-2,5-dieno[2,3-d]isoxazole-
4,1'-cyclopropane]-11β,17β-diol;
17α-propylspiro[androsta-2,5-dieno[2,3-d]isoxazole-
4,1'-cyclopropane]-11β,17β-diol;
17α-ethenylspiro[androsta-2,5-dieno[2,3-d]isoxazole-
4,1'-cyclopropane]-11β,17β-diol;
17α-allylspiro[androsta-2,5-dieno[2,3-d]isoxazole-
4,1'-cyclopropane]-11β,17β-diol;
17α-ethynylspiro[androsta-2,5-dieno[2,3-d]isoxazole-
4,1'-cyclopropane]-11β,17β-diol;
17α-propynylspiro[androsta-2,5-dieno[2,3-d]isoxazole-
4,1'-cyclopropane]-11β,17β-diol;
17β-hydroxyspiro[androsta-2,5-dieno[2,3-d]isoxazole-
4,1'-cyclopropan]-11-one;
17β-hydroxy-17α-methylspiro[androsta-2,5-dieno[2,3-d]
isoxazole-4,1'-cyclopropan]-11-one;
17α-ethyl-17β-hydroxyspiro[androsta-2,5-dieno[2,3-d]
isoxazole-4,1'-cyclopropan]-11-one;
17β-hydroxy-17α-propylspiro[androsta-2,5-dieno[2,3-d]
isoxazole-4,1'-cyclopropan]-11-one;
17α-ethenyl-17β-hydroxyspiro[androsta-2,5-dieno[2,3-d]
isoxazole-4,1'-cyclopropan]-11-one;
17α-allyl-17β-hydroxyspiro[androsta-2,5-dieno[2,3-d]
isoxazole-4,1'-cyclopropan]-11-one;
17α-ethynyl-17β-hydroxyspiro[androsta-2,5-dieno[2,3-d]
isoxazole-4,1'-cyclopropan]-11-one;
17β-hydroxy-17α-propynylspiro[androsta-2,5-dieno[2,3-
d]isoxazole-4,1'-cyclopropan]-11-one;
spiro[estra-2,5-dieno[2,3-d]isoxazole-4,1'-cyclopropan]-
17β-ol;
17α-methylspiro[estra-2,5-dieno[2,3-d]isoxazole-4,1'-
cyclopropan]-17β-ol;
17α-ethylspiro[estra-2,5-dieno[2,3-d]isoxazole-4,1'-
cyclopropan]-17β-ol;
17α-propylspiro[estra-2,5-dieno[2,3-d]isoxazole-4,1'-
cyclopropan]-17β-ol;
17α-ethenylspiro[estra-2,5-dieno[2,3-d]isoxazole-4,1'-
cyclopropan]-17β-ol;
17α-allylspiro[estra-2,5-dieno[2,3-d]isoxazole-4,1'-
cyclopropan]-17β-ol;
17α-ethynylspiro[estra-2,5-dieno[2,3-d]isoxazole-4,1'-
cyclopropan]-17β-ol;
17α-propynylspiro[estra-2,5-dieno[2,3-d]isoxazole-4,1'-
cyclopropan]-17β-ol;
spiro[estra-2,5-dieno[2,3-d]isoxazole-4,1'-cyclopropane]-11β,17β-diol;
17α-methylspiro[estra-2,5-dieno[2,3-d]isoxazole-4,1'-
cyclopropane]-11β,17β-diol;
17α-ethylspiro[estra-2,5-dieno[2,3-d]isoxazole-4,1'-
cyclopropane]-11β,17β-diol;
17α-propylspiro[estra-2,5-dieno[2,3-d]isoxazole-4,1'-
cyclopropane]-11β,17β-diol;
17α-ethenylspiro[estra-2,5-dieno[2,3-d]isoxazole-4,1'-
cyclopropane]-11β,17β-diol;
17α-allylspiro[estra-2,5-dieno[2,3-d]isoxazole-4,1'-
cyclopropane]-11β,17β-diol;
17α-ethynylspiro[estra-2,5-dieno[2,3-d]isoxazole-4,1'-
cyclopropane]-11β,17β-diol;
17α-propynylspiro[estra-2,5-dieno[2,3-d]isoxazole-4,1'-
cyclopropane]-11β,17β,-diol;
17β-hydroxyspiro[estra-2,5-dieno[2,3-d]isoxazole-4,1'-
cyclopropan]-11-one;
17β-hydroxy-17α-methylspiro[estra-2,5-dieno[2,3-d]
isoxazole-4,1'-cycylopropan]-11-one;
17α-ethyl-17β-hydroxyspiro[estra-2,5-dieno[2,3-d]
isoxazole-4,1'-cyclopropan]-11-one;
17β-hydroxy-17α-propylspiro[estra-2,5-dieno[2,3-d]
isoxazole-4,1'-cyclopropan]-11-one;
17α-ethenyl-17β-hydroxyspiro[estra-2,5-dieno[2,3-d]
isoxazole-4,1'-cyclopropan]-11-one;

17α-allyl-17β-hydroxyspiro[estra-2,5-dieno[2,3-d]
  isoxazole-4,1'-cyclopropan]-11-one;
17α-ethynyl-17β-hydroxyspiro[estra-2,5-dieno[2,3-d]
  isoxazole-4,1'-cyclopropan]-11-one; and
17β-hydroxy-17α-propynylspiro[estra-2,5-dieno[2,3-d]
  isoxazole-4,1'-cyclopropan]-11-one; respectively, and
  the like.

Example 7.—17β - hydroxy - 17α-methyl-3-oxospiro[androst-5-ene-4,1'-cyclopropane]2α-carbonitrile (V)

A mixture of 9 g. of crude isoxazoles, prepared in Example 5, above, comprising 17α-methylspiro[androsta-2,5 - dieno[2,3-d]isoxazole-4,1'-cyclopropan]-17β-ol (IV) and 17,17 - dimethylspiro[cyclopropane-1,4'-[18]norandrosta-2,5,13-trieno[2,3-d]isoxazole], 70 ml. of dry tetrahydrofuran, and 2.7 g. of powdered sodium methoxide is stirred for about 50 minutes and then heated to reflux for about 5 minutes. The reaction mixture is then cooled and 900 ml. of water is added. The aqueous mixture is then acidified with concentrated hydrochloric acid, cooled in an ice bath and extracted with methylene chloride. The methylene chloride extract is washed with water, dried over anhydrous magnesium sulfate and evaporated to give 8.8 g. of an oil which slowly solidifies. The solid residue thus obtained is dissolved in 10% acetone-methylene chloride and adsorbed on a 1 kg. column of silica gel (packed in 10% acetone-methylene chloride). The column is eluted with 10% acetone-methylene chloride collecting 200 ml. fractions. Fractions 8–10 are combined; the solvent is removed by distillation and the residue thus obtained is crystallized from acetone-Skellysolve B hexanes to give 0.67 g. of 17,17 - dimethyl-3-oxospiro[cyclopropane - 1,4' - [18]norandrosta[5,13]diene-2α-carbonitrile, M.P. 149–153° C.; [α]$_D$ CHCl$_3$ —144°; IR and NMR data support the assigned structure.

*Analysis.*—Calcd. for C$_{23}$H$_{29}$NO (percent): C, 82.34; H, 8.71; N, 4.18. Found (percent): C, 81.73; H, 9.16; N, 4.18.

Fractions 15–27 are combined, evaporated and the residue crystallized from acetone-Skellysolve B hexanes to give 5.7 g. of 17β - hydroxy-17-methyl-3-oxospiro[androst-5-ene - 4,1'-cyclopropane]-2α-carbonitrile (V) M.P. 207–209.5° C.; a sample recrystallized from the same solvent mixture melted at 207–209.5° C.; [α]$_D$ CHCl$_3$ —49°; IR and NMR data support the assigned structure.

*Analysis.*—Calcd. for C$_{23}$H$_{31}$NO$_2$ (percent): C, 78.14; H, 8.84; N, 3.96. Found (percent): C, 77.92; H, 8.98; N, 3.83.

Example 8.—17β-hydroxy-3-oxospiro[androst-5-ene-4,1'-cyclopropane]-2α-carbonitrile (V)

Following the procedure of Example 7, above, an equivalent amount of spiro[androsta-2,5-dieno[2,3-d]isoxazole-4,1'-cyclopropane]-17β-ol (IV) is treated with sodium methoxide to obtain 17β - hydroxy-3-oxospiro[androst-5-ene-4,1'-cyclopropane]-2α-carbonitrile (V).

In the same manner following the procedure of Example 7, above, other isoxazoles of Formula IV are likewise converted to the corresponding 2α-carbonitriles of Formula V, in which R$_1$ is hydrogen, for example the compounds prepared and listed in Example 6, above, give:

17α-ethyl-17β-hydroxy-3-oxospiro[androst-5-ene-4,1'-cyclopropane]-2α-carbonitrile;
17β-hydroxy-3-oxo-17α-propylspiro[androst-5-ene-4,1'-cyclopropane]-2α-carbonitrile;
17α-ethenyl-17β-hydroxy-3-oxospiro[androst-5-ene-4,1'-cyclopropane]-2α-carbonitrile;
17α-allyl-17β-hydroxy-3-oxospiro[androst-5-ene-4,1'-cyclopropane]-2α-carbonitrile;
17α-ethynyl-17β-hydroxy-3-oxospiro[androst-5-ene-4,1'-cyclopropane]-2α-carbonitrile;
17α-propynyl-17β-hydroxy-3-oxospiro[androst-5-ene-4,1'-cyclopropane]-2α-carbonitrile;
11β,17β-dihydroxy-3-oxospiro[androst-5-ene-4,1'-cyclopropane]-2α-carbonitrile;
11β,17β-dihydroxy-3-oxo-17α-methylspiro[androst-5-ene-4,1'cyclopropane]-2α-carbonitrile;
17α-ethyl-11β,17β-dihydroxy-3-oxospiro[androst-5-ene-4,1'-cyclopropane]-2α-carbonitrile;
11β,17β-dihydroxy-17α-propylspiro[androst-5-ene-4,1'-cyclopropane]-2α-carbonitrile;
17α-ethenyl-11β,17β-dihydroxy-3-oxospiro[androst-5-ene-4,1'-cyclopropane]-2α-carbonitrile;
17α-allyl-11β,17β-dihydroxy-3-oxospiro[androst-5-ene-4,1'-cyclopropane]-2α-carbonitrile;
17α-ethynyl-11β,17β-dihydroxy-3-oxospiro[androst-5-ene-4,1'-cyclopropane]-2α-carbonitrile;
11β,17β-dihydroxy-3-oxo-17α-propynylspiro[androst-5-ene-4,1'-cyclopropane]-2α-carbonitrile;
17β-hydroxy-3,11-dioxospiro[androst-5-ene-4,1'-cyclopropane]-2α-carbonitrile;
17β-hydroxy-3,11-dioxo-17α-methylspiro[androst-5-ene-4,1'-cyclopropane]-2α-carbonitrile;
17α-ethyl-17β-hydroxy-3,11-dioxospiro]androst-5-ene-4,1'-cyclopropane]-2α-carbonitrile;
17β-hydroxy-3,11-dioxo-17α-propylspiro[androst-5-ene-4,1'-cyclopropane]-2α-carbonitrile;
17α-ethenyl-17β-hydroxy-3,11-dioxospiro[androst-5-ene-4,1'-cyclopropane]-2α-carbonitrile;
17α-allyl-17β-hydroxy-3,11-dioxospiro[androst-5-ene-4,1'-cyclopropane]-2α-carbonitrile;
17α-ethynyl-17β-hydroxy-3,11-dioxospiro[androst-5-ene-4,1'-cyclopropane]-2α-carbonitrile;
17β-hydroxy-3,11-dioxo-17α-propynylspiro[androst-5-ene-4,1'-cyclopropane]-2α-carbonitrile;
17β-hydroxy-3-oxospiro[estra-5-ene-4,1'-cyclopropane]-2α-carbonitrile;
17β-hydroxy-3-oxo-17α-methylspiro[estra-5-ene-4,1'-cyclopropane]-2α-carbonitrile;
17α-ethyl-17β-hydroxy-3-oxospiro[estra-5-ene-4,1'-cyclopropane]-2α-carbonitrile;
17α-propyl-17β-hydroxy-3-oxospiro[estra-5-ene-4,1'-cyclopropane]-2α-carbonitrile;
17α-ethenyl-17β-hydroxy-3-oxospiro[estra-5-ene-4,1'-cyclopropane]-2α-carbonitrile;
17α-allyl-17β-hydroxy-3-oxospiro[estra-5-ene-4,1'-cyclopropane]-2α-carbonitrile;
17α-ethynyl-17β-hydroxy-3-oxospiro[estra-5-ene-4,1'-cyclopropane]-2α-carbonitrile;
17α-propynyl-17β-hydroxy-3-oxospiro[estra-5-ene-4,1'-cyclopropane]-2α-carbonitrile;
11β,17β-dihydroxy-3-oxospiro[estra-5-ene-4,1'-cyclopropane]-2α-carbonitrile;
11β,17β-dihydroxy-3-oxo-17α-methylspiro[estra-5-ene-4,1'-cyclopropane]-2α-carbonitrile;
17α-ethyl-11β,17β-dihydroxy-3-oxospiro[estra-5-ene-4,1'-cyclopropane]-2α-carbonitrile;
11β,17β-dihydroxy-3-oxo-17α-propylspiro[estra-5-ene-4,1'-cyclopropane]-2α-carbonitrile;
17α-ethenyl-11β,17β-dihydroxy-3-oxospiro[estra-5-ene-4,1'-cyclopropane]-2α-carbonitrile;
17α-allyl-11β,17β-dihydroxy-3-oxospiro[estra-5-ene-4,1'-cyclopropane]-2α-carbonitrile;
17α-ethnyl-11β,17β-dihydroxy-3-oxospiro[estra-5-ene-4,1'-cyclopropane]-2α-carbonitrile;
11β,17β-dihydroxy-3-oxo-17α-propynylspiro[estra-5-ene-4,1'-cyclopropane]-2α-carbonitrile;
17α-allyl-11β,17β-dihydroxy-3-oxospiro[estra-5-ene-4,1'-cyclopropane]-2α-carbonitrile;
17β-hydroxy-3,11-dioxo-17α-methylspiro[estra-5-ene-4,1'-cyclopropane]-2α-carbonitrile;
17α-ethyl-17β-hydroxy-3,11-dioxospiro[estra-5-ene-4,1'-cyclopropane]-2α-carbonitrile;
17β-hydroxy-3,11-dioxo-17α-propylspiro[estra-5-ene-4,1'-cyclopropane]-2α-carbonitrile;
17α-ethenyl-17β-hydroxy-3,11-dioxospiro[estra-5-ene-4,1'-cyclopropane]-2α-carbonitrile;
17α-allyl-17β-hydroxy-3,11-dioxospiro[estra-5-ene-4,1'-cyclopropane]-2α-carbonitrile;

17α-ethynyl-17β-hydroxy-3,11-dioxospiro[estra-5-ene-4,1'-cyclopropane]-2α-carbonitrile;
17β-hydroxy-3,11-dioxo-17α-propynylspiro[estra-5-ene-4,1'-cyclopropane]-2α-carbonitrile; respectively, and the like.

Example 9.—17β-hydroxy-17α-methylspiro[androst-5-ene-4,1'-cyclopropan]-3-one 17-acetate (II)

A solution of 1 g. of 17β-hydroxy-17α-methylspiro[androst-5-ene-4,1'-cyclopropan]-3-one (II) in 5 ml. of pyridine and 2 ml. of acetic anhydride is heated under nitrogen at about 80° C. for about 16 hours. The solvent is removed on a rotary evaporator and the residue triturated with Skellysolve B hexanes then washed with Skellysolve B hexanes and methanol, and crystallized from acetone-Skellysolve B hexanes to give 17β-hydroxy-17α-methylspiro[androst-5-ene-4,1'-cyclopropan]-3-one 17 - acetate (II).

In the same manner as in Example 9, the 17-propionate, 17-butyrate, 17-hexanoate, 17-phenylacetate, 17-cinnamate and other like 17 esters of 17β-hydroxy-17α-methylspiro[androst-5-ene-4,1'-cyclopropan]-3-one (II) are prepared by reaction of the 17β-alcohol (II) with the appropriate acid anhydride or halide.

Following the procedure of the immediately preceding paragraph and of Example 9, but substituting other starting materials of Formula II, in which $R_1$ is hydrogen and $R_2$ is alkyl, alkenyl or alkynyl, yields the corresponding 17-acylate of Formula II, in which $R_1$ is acyl.

Example 10.—17β-hydroxyspiro[androst-5-ene-4,1'-cyclopropan]-3-one 17-acetate (II)

A solution of 1 g. of 17β-hydroxyspiro[androst-5-ene-4,1'-cyclopropan]-3-one (II) in 5 ml. of pyridine and 2 ml. of acetic anhydride is stirred under nitrogen at room temperature for about 16 hours. The solvent is removed on a rotary evaporator and the residue triturated with Skellysolve B hexanes then washed with Skellysolve B hexanes and methanol, and crystallized from acetone-Skellysolve B hexanes to give 17β-hydroxyspiro[androst-5-ene-4,1'-cyclopropan]-3-one 17-acetate (II).

In the same manner as in Example 10, the 17-propionate, 17-butyrate, 17-hexanoate, 17-phenylacetate, 17-cinnamate and other like 17-esters of 17β-hydroxyspiro[androst-5-ene-4,1'-cyclopropan]-3-one (II) are prepared by reaction of the 17β-alcohol (II) with the appropriate acid anhydride or halide.

Following the procedure of the immediately preceding paragraph and of Example 10, but substituting other starting materials of Formula II, in which $R_1$ and $R_2$ are each hydrogen, yields the corresponding 17-acylate of Formula II, in which $R_1$ is acyl.

Example 11.—17β-hydroxy - 17α - methyl - 3 - oxospiro[androst - 5 - ene - 4,1' - cyclopropane] - 2α - carbonitrile 17-acetate (V)

A solution of 1 g. of 17β-hydroxy - 17α - methyl-3-oxospiro[androst - 5 - ene - 4,1' - cyclopropan] - 2α-carbonitrile (V) in 5 ml. of pyridine and 2 ml. of acetic anhydride is heated under nitrogen at about 80° C. for about 16 hours. The solvent is removed on a rotary evaporator and the residue triturated with Skellysolve B hexanes then washed with Skellysolve B hexanes and methanol, and crystallized from acetone-Skellysolve B hexanes to give 17β-hydroxy - 17α - methyl - 3 - oxospiro[androst - 5 - ene - 4,1' - cyclopropane] - 2α - carbonitrile 17-acetate (V).

In the same manner as in Example 11, the 17-propionate, 17-butyrate, 17-hexanoate, 17-phenylacetate, 17-cinnamate and other like 17-esters of 17β-hydroxy-17α-methyl-3-oxospiro[androst-5-ene - 4,1' - cyclopropane]-2α-carbonitrile (V) are prepared by reaction of the 17β-alcohol (II) with the appropriate acid anhydride or halide.

Following the procedure of the immediately preceding paragraph and of Example 11, but substituting other starting materials of Formula V, in which $R_1$ is hydrogen and $R_2$ is alkyl, alkenyl or alkynyl, yields the corresponding 17-acylate of Formula V in which $R_1$ is acyl.

Example 12.—17β - hydroxy - 3 - oxospiro[androst - 5-ene - 4,1' - cyclopropane] - 2α - carbonitrile 17 - acetate (V)

A solution of 1 g. of 17β-hydroxy-3-oxospiro[androst-5-ene - 4,1' - cyclopropane] - 2α - carbonitrile (V) in 5 ml. of pyridine and 2 ml. of acetic anhydride is stirred under nitrogen at room temperature for about 16 hours. The solvent is removed on a rotary evaporator and the residue triturated with Skellysolve B hexanes then washed with Skellysolve B hexanes and methanol, and crystallized from acetone-Skellysolve B hexanes to give 17β-hydroxy-3-oxospiro[androst - 5 - ene - 4,1' - cyclopropane]-2α-carbonitrile 17-acetate (V).

In the same manner as in Example 12, the 17-propionate, 17-butyrate, 17-hexanoate, 17-phenylacetate, 17-cinnamate and other like 17-esters of 17β-hydroxy-3-oxospiro[androst - 5 - ene - 4,1' - cyclopropan]-2α-carbonitrile (V) are prepared by reaction of the 17β-alcohol (V) with the appropriate acid anhydride or halide.

Following the procedure of the immediately preceding paragraph and of Example 12, but substituting other starting materials of Formula II, in which $R_1$ and $R_2$ are each hydrogen, yields the corresponding 17-acylate of Formula II, in which $R_1$ is acyl.

I claim :
1. A compound selected from the formulae:

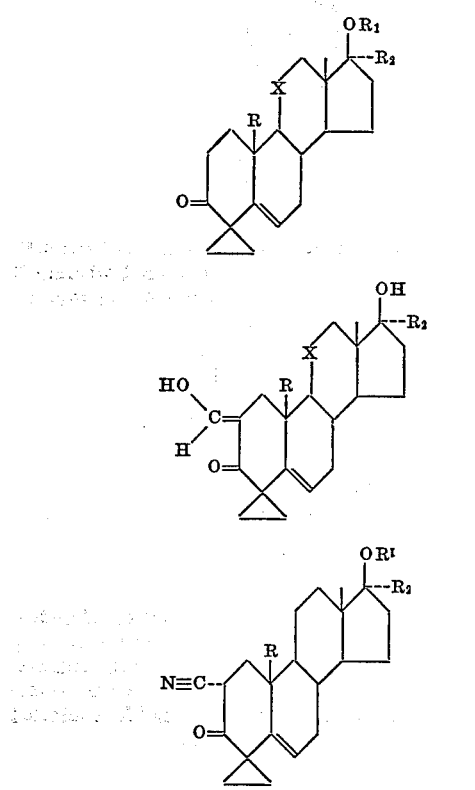

wherein R is selected from the group consisting of hydrogen and methyl; $R_1$ is selected from the group consisting of hydrogen and the acyl radical of a hydrocarbon carboxylic acid of 1 to 12 carbon atoms, inclusive, $R_2$ is selected from the group consisting of hydrogen, lower-alkyl of 1 to 5 carbon atoms, inclusive; lower-alkenyl of 2 to 5 carbon atoms, inclusive, and lower-alkynyl of 2 to 5 carbon atoms, inclusive; and X is selected from the group consisting of methylene

β-hydroxymethylene

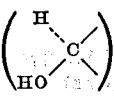

and carbonyl (O=C<).

2. A compound of the formula:

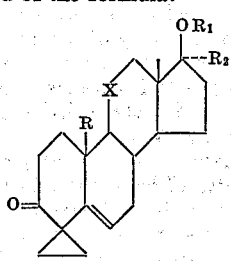

wherein R is selected from the group consisting of hydrogen and methyl; $R_1$ is selected from the group consisting of hydrogen and the acyl radical of a hydrocarbon carboxylic acid of 1 to 12 carbon atoms, inclusive. $R_2$ is selected from the group consisting of hydrogen, lower-alkyl of 1 to 5 carbon atoms, inclusive; lower-alkenyl of 2 to 5 carbon atoms, inclusive, and lower-alkynyl of 2 to 5 carbon atoms, inclusive; and X is selected from the group consisting of methylene

β-hydroxymethylene

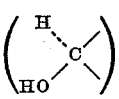

and carbonyl (O=C<).

3. 17β - hydroxy - 17α - methylspiro[androst-5-ene-4,1'-cyclopropan]-3-one, the compound of claim 2 wherein R is methyl, $R_1$ is hydrogen, $R_2$ is methyl and X is methylene.

4. A compound of the formula:

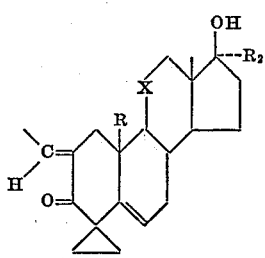

wherein R is selected from the group consisting of hydrogen and methyl; $R_2$ is selected from the group consisting of hydrogen, lower-alkyl of 1 to 5 carbon atoms, inclusive, lower-alkenyl of 2 to 5 carbon atoms, inclusive, and lower-alkynyl of 2 to 5 carbon atoms inclusive; and X is selected from the group consisting of methylene

β-hydroxymethylene

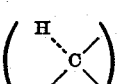

and carbonyl (O=C<).

5. 17β - hydroxy - 2 - (hydroxymethylene) - 17α-methylspiro[androst - 5-ene-4,1'-cyclopropan]-3-one, the compound of claim 4, wherein R and $R_2$ are each methyl and X is methylene.

6. A compound of the formula:

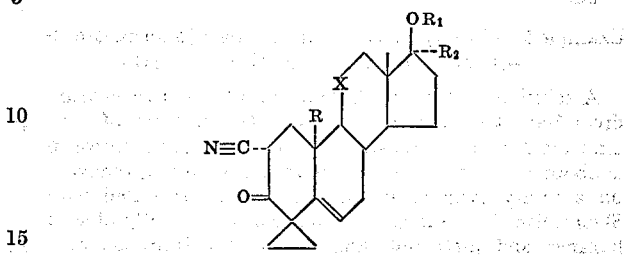

wherein R is selected from the group consisting of hydrogen and methyl; $R_1$ is selected from the group consisting of hydrogen and the acyl radical of a hydrocarbon carboxylic acid of 1 to 12 carbon atoms, inclusive, $R_2$ is selected from the group consisting of hydrogen, lower-alkyl of 1 to 5 carbon atoms, inclusive; lower-alkenyl of 2 to 5 carbon atoms, inclusive, and lower-alkynyl of 2 to 5 carbon atoms, inclusive; and X is selected from the group consisting of methylene

β-hydroxymethylene

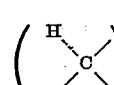

and carbonyl (O=C<), and the alkali metal salts thereof.

7. 17β - hydroxy - 17α - methyl - 3 - oxospiro[androst-5 - ene - 4,1' - cyclopropane] - 2α - carbonitrile, the compound of claim 6, wherein R is methyl, $R_1$ is hydrogen, $R_2$ is methyl and X is methylene.

8. A compound of the formula:

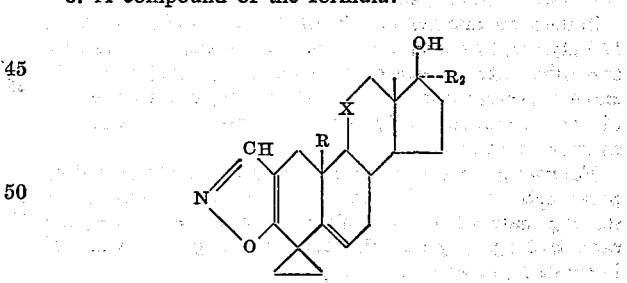

wherein R is selected from the group consisting of hydrogen and methyl; $R_2$ is selected from the group consisting of hydrogen, lower-alkyl of 1 to 5 carbon atoms, inclusive; lower-alkenyl of 2 to 5 carbon atoms, inclusive, and lower-alkynyl of 2 to 5 carbon atoms, inclusive; and X is selected from the group consisting of methylene

β-hydroxymethylene

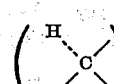

and carbonyl (O=C<).

9. 17α - methylspiro[androsta - 2,5 - dieno[2,3-d]isoxazole-4,1'-cyclopropan]-17β-ol, the compound of claim 8, wherein R and $R_2$ are each methyl and X is methylene.

10. The process for the production of a compound of the formula:

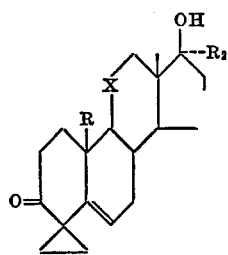

wherein R is selected from the group consisting of hydrogen and methyl; $R_2$ is selected from the group consisting of hydrogen, lower-alkyl of 1 to 5 carbon atoms, inclusive; lower-alkenyl of 2 to 5 carbon atoms, inclusive, and lower-alkynyl of 2 to 5 carbon atoms, inclusive; and X is selected from the group consisting of methylene

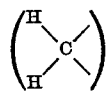

β-hydroxymethylene

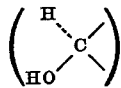

and carbonyl (O=C<); which comprises reacting a compound of the formula:

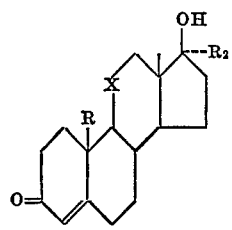

wherein R, $R_2$ and X have the meanings given, above, with a 1,2-dihaloethane selected from the group consisting of 1,2 - dibromoethane, 1,2 - dichloroethane and 1,2 - diiodoethane, in the presence of a base selected from the group consisting of sodium amide and potassium amide in liquid ammonia.

11. The process of claim 10, wherein the 1,2-dihaloethane is 1,2-dibromoethane.

12. The process of claim 10, wherein the starting material is 17α-methyltestosterone and the product obtained is 17β - hydroxy - 17α - methylspiro[androst - 5 - ene-4,1'-cyclopropan]-3-one.

No references cited.

HENRY A. FRENCH, Primary Examiner

U.S. Cl. X.R.

260—397.4, 999

UNITED STATES PATENT OFFICE
CERTIFICATE OF CORRECTION

Patent No. 3,793,308　　　　　　　Dated February 19, 1974

Inventor(s) Gilbert A. Youngdale

It is certified that error appears in the above-identified patent and that said Letters Patent are hereby corrected as shown below:

Column 5, line 34, "H, 9.98" should read -- H, 9.83 --; Column 7, line 7, "methylspiro" should read -- propylspiro --; line 22, "(hydroxymethylene-17" should read -- (hydroxymethylene)-17 --; line 23, "cycloprpan" should read -- cyclopropan --; Column 8, line 3 "propyl" should read -- propynyl --; line 63, "hydroxymethyl)" should read -- (hydroxymethylene) --; Column 9, line 12, "diene" should read -- dieno --; line 42, "diene" should read -- dieno --; line 50, "diene" should read -- dieno --; line 57, "diene" should read -- dieno --; line 64, "diene" should read -- dieno --; line 66, "diene" should read -- dieno --; line 68, "diene" should read -- dieno --; line 74, "diene" should read -- dieno --; Column 11, line 33, "1,4'" should read -- 1',4 --; Column 12, line 59, "ethnyl" should read -- ethynyl --; line 63, "17α-allyl-11β,17β-dihydroxy-3-oxospiro[estra-5-ene-4,1'-cyclopropane-2α-carbonitrile:" should read -- 17β-hydroxy-3,11-dioxospiro-[estra-5-ene-4,1'-cyclopropane]-2α-carbonitrile: --, Column 15, line 75, "(O=⊂)" should read -- (O=C⊂) --.

Signed and sealed this 5th day of November 1974.

(SEAL)
Attest:

McCOY M. GIBSON JR.
Attesting Officer

C. MARSHALL DANN
Commissioner of Patents